United States Patent [19]

Stratmann et al.

[11] 4,425,371

[45] Jan. 10, 1984

[54] MARGARINE FAT BLEND

[75] Inventors: Wilhelm Stratmann, Weinheim, Fed. Rep. of Germany; Leo F. Vermaas, Maassluis; Willem Dijkshoorn, Vlaardingen, both of Netherlands

[73] Assignee: Lever Brothers Company, New York, N.Y.

[21] Appl. No.: 388,353

[22] Filed: Jun. 14, 1982

[30] Foreign Application Priority Data

Jun. 15, 1981 [GB] United Kingdom ............... 8118354

[51] Int. Cl.³ .......................... A23D 3/00; A23D 5/00
[52] U.S. Cl. ..................................... 426/603; 426/607
[58] Field of Search ........................ 426/603, 604, 607

[56] References Cited

U.S. PATENT DOCUMENTS

| | | | |
|---|---|---|---|
| 3,597,229 | 8/1971 | Mijnders et al. | 426/603 |
| 3,607,305 | 9/1971 | Westenberg | 426/607 X |
| 3,956,522 | 5/1976 | Kattenberg et al. | 426/603 |
| 4,087,564 | 5/1978 | Poot et al. | 426/603 |
| 4,230,737 | 10/1980 | Heider et al. | 426/607 |
| 4,316,919 | 2/1982 | Pelloso et al. | 426/607 X |

FOREIGN PATENT DOCUMENTS

| | | |
|---|---|---|
| 9207 | 4/1980 | European Pat. Off. . |
| 1121662 | 7/1968 | United Kingdom . |

OTHER PUBLICATIONS

"Journal of the American Oil Chemists' Society", (1977), vol. 54, pp. 408-413.

*Primary Examiner*—Robert A. Yoncoskie
*Attorney, Agent, or Firm*—Amirali Y. Haidri; James J. Farrell

[57] ABSTRACT

A margarine fat blend having a good melting behavior under temperature conditions prevailing in the mouth is produced according to a process involving (i) random interesterification of a mixture of hydrogenated and non-hydrogenated oils, (ii) fractionating the interesterified mixture to obtain a specific olein fraction, and (iii) mixing appropriate proportions of the olein with liquid oil.

The stearin fraction can be recirculated in the system by substituting it for at least part of the hydrogenated oil in the mixture to be interesterified.

16 Claims, No Drawings

MARGARINE FAT BLEND

The present invention relates to a margarine fat, particularly to margarines and spreads containing said fat and to a process for producing said margarine fat.

More particularly the invention relates to a margarine fat and margarines predominantly and preferably exclusively consisting of vegetable oil as the fat component.

There is a need for margarines, particularly vegetable margarines which (a) spread easily, (b) contain a relatively high proportion of unsaturated fatty acids, (c) have good organoleptic properties, i.e. a good melting behaviour under temperature conditions prevailing in the mouth, in the absence of lauric fats or in the presence of a very low level of lauric fats, and (d) have a relatively low trans-fatty acid level, e.g. a level not exceeding 15% and preferably a level lower than 10%.

There is also a need for an economical process for producing a margarine fat which is useful for preparing margarines meeting the above requirements.

The process according to the invention comprises
(1) randomly interesterifying a mixture containing 45–75 wt% of an oil (i) in which at least 20% of the fatty acid residues consist of linoleic acid and 25–55 wt% of an oil or fat (ii) in which at least 80% of the fatty acid residues is saturated and have a chain length of at least 16 carbon atoms;
(2) fractionating the interesterified mixture thus produced to obtain an olein having the following solid fat content:
$N_{10}=25-53$
$N_{20}=8-28$
$N_{30}=1-6$
$N_{35}=0-4$,
separating the higher melting stearin; and
(3) mixing 50–90% of the olein with 10–50 wt% of an oil (iii) in which at least 40% of the fatty acid residues consist of linoleic acid.

The solid fat contents are expressed in N-values, essentially as described in Fette, Seifen, Anstrichmittel 80, 180–186 (1978). The method was however modified as regards the stabilization of the material before measurement. In all cases the fat was stabilized for 16 h at 0° C. and 1 h at the measuring temperature.

Oil (i) preferably consists of a vegetable oil such as soybean oil, sunflower oil, safflower oil, rapeseed oil, cottonseed oil, maize oil, olive oil, etc. or mixtures thereof. For practical purposes sunflower oil is preferred.

The oil or fat (ii) preferably consists of any of the oils (i) or a mixture thereof, which has been hydrogenated to obtain a fat in which at least 80% of the fatty acid residues is saturated, using e.g. a freshly precipitated Ni-catalyst under conditions avoiding trans fatty acids formation to a level exceeding 15% and preferably avoiding levels exceeding 10%. Oil or fat (ii) preferably has a melting point ranging from 50°–70° C. and an iodine value of less than 10, preferably less than 5.

The oil (iii) preferably consists of safflower oil, sunflower oil, maize oil, grapeseed oil, soybean oil, rapeseed oil, cottonseed oil or mixtures thereof.

It is very convenient that oils (i), (ii) and (iii) derive from the same source and ideally from sunflower oil, which is readily available at a reasonable price.

Random interesterification can be carried out in a way known per se, using as a catalyst alkali metals, their alloys, their hydroxides or alkoxides at a level of 0.01–0.5 wt% at 25°–175° C., preferably at a temperature ranging from 80°–140° C., using fats substantially free of moisture, i.e. fats containing less than about 0.01% of moisture.

The proportion of oil (i) in the mixture to be interesterified should not be too high, in order to obtain a reasonable yield of the olein. On the other hand it should not be too low, since otherwise the level of solids at 10° C. of the olein would be too low. It is therefore important that oils (i) and (ii) are present in proportions within the given ranges.

The triglycerides present in the interesterified mixture should preferably comprise (i) 30–60% of saturated $C_{16}$ or $C_{18}$ fatty acid residues, the remainder being unsaturated fatty acid residues, preferably of the linoleic type, and (ii) 3–20% of triglycerides derived from trisaturated fatty acid residues.

The fractionation can be carried out in the presence of a solvent, in the presence of a detergent (Lanza fractionation) or in the absence of a solvent (dry-fractionation). The fractionation is preferably carried out under conditions such that the level of triglycerides derived from the saturated fatty acids is less than 6%, preferably less than 3%. Preferably dry-fractionation is applied, e.g. in a pelletizer at a temperature ranging from 30° to 40° C., preferably from 32° to 38° C., to obtain an olein as hereinbefore defined and a stearin having the following characteristics:
$N_{10}=45-70$
$N_{15}=44-65$
$N_{20}=42-52$
$N_{25}=30-40$
$N_{30}=27-37$
$N_{35}=20-30$.

According to a preferred embodiment of the present invention the stearin obtained by fractionation of the randomly interesterified blend is recirculated.

One way of re-using the stearin according to the invention involves:
(i) hydrogenating the stearin to obtain a fat having substantially the same slip melting point as the saturated oil used in the mixture subjected to interesterification and an iodine value of less than 5 and preferably less than 2;
(ii) subjecting a mixture consisting of appropriate proportions of the hydrogenated stearin and oil to random interesterification;
(iii) fractionating said interesterified blend under conditions such as to obtain an olein comparable to the olein as defined above;
(iv) mixing appropriate proportions of the olein obtained and oil to obtain a margarine fat blend.

Another way of re-using the stearin according to the invention involves
(i) subjecting appropriate proportions of the stearin as such and oil to random interesterification;
(ii) fractionating the interesterified mixture to obtain an olein fraction comparable to the olein as defined above; and
(iii) mixing appropriate proportions of the olein obtained and oil to obtain a margarine fat.

In step (iii) preferably 15–30 wt% of oil (iii) is mixed with preferably 70–85 wt% of olein to obtain the preferred margarine fat blends according to the invention. The margarine fat blends according to the invention therefore comprise from 10 to 50 wt%, preferably from 15 to 30 wt% of oil (iii) and from 50–90 wt%, preferably from 70 to 85 wt%, of the olein as hereinbefore defined and preferably have the following characteristics:

$N_{10} = 20-35$
$N_{20} = 5-15$
$N_{30} = 1-6$
$N_{35} = 0-2$
$N_{10} - N_{20} \geq 10$, (the difference $N_{10}-N_{30}$ reflects the cooling properties of the margarine fat) and a level of trans fatty acids not exceeding 15% and preferably lower than 10%.

The level of trans fatty acids is measured according to J.A.O.C. 54, 47 (1971) as elaidic acid content (isolated mono-trans).

The margarine fat according to the invention can be processed into a margarine or spread after mixing with an aqueous phase by means of well-known methods involving working and cooling, preferably using surface-scraped coolers and resting tubes, e.g. a Votator apparatus.

The invention will now be illustrated by the following Examples:

EXAMPLE 1

An olein fraction was produced by:
(1) randomly interesterifying a mixture consisting of 60% by weight of sunflower oil and 40% by weight of sunflower oil hydrogenated to a melting point of 69° C.

The interesterification was carried out using a vacuum-dried mixture of the oils at 120° C. for 20 minutes, using 0.12 wt% of $NaOC_2H_5$.

Hydrogenation was carried out using a fresh Ni catalyst at 150° C. for 1 hour, followed by a further period at 180° C. until the product obtained had an iodine value of 2 or less.

(2) Dry-fractionation of the interesterified blend at 35° C. in a pelletizer.

A margarine fat blend was produced by mixing 20 parts of sunflower oil and 80 parts of the separated olein fraction.

Analytical data relating to the interesterified fat blend, the fractions obtained after interesterification, sunflower oil and the margarine fat are given in Tables A and B.

A margarine was produced by (i) mixing appropriate proportions of the fat blend (84 wt%) and an aqueous phase (16 wt%) and (ii) processing the mixture through Votator units (A and C units).

The margarine obtained was assessed by objective measurements and subjected to a panel for assessment of the melting behaviour in the mouth (see Table C).

The stearin fraction obtained by dry-fractionation was completely hardened to obtain solid values comparable to sunflower oil hydrogenated to a melting point of 69° C. [(see Table D, N° (1)].

This hardened stearin was recirculated by blending it with sunflower oil (40% of hardened stearin, 60% of sunflower oil) and the mixture was randomly interesterified (interesterified blend 1, see Table D, N° (2)) and subsequently dry-fractionated under the same conditions as outlined above to obtain an olein (see Table D, N° (4)), which was mixed with sunflower oil (20 parts of sunflower oil, 80 parts of olein) to obtain a margarine fat blend. This olein had a percentage of trans-fatty acids which was lower than 3%. Margarines produced with this fat blend were comparable to the margarines produced above (Tables B and C).

EXAMPLE 2

Example 1 was repeated, except that the stearin fraction obtained by dry-fractionation was recirculated as follows:
(i) a mixture of the stearin fraction and sunflower oil (85/15) was produced;
(ii) the mixture was subjected to random interesterification under conditions as outlined in Example 1 (Table D, N° (3), interesterified blend II);
(iii) the interesterified mixture was dry-fractionated at 35° C. to obtain an olein fraction (see Table D, N° (6), which had a percentage of trans-fatty acids which was lower than 3%. 20 Parts of sunflower oil and 80 parts of this olein were mixed to obtain a margarine fat blend.

Margarines produced with that fat blend were comparable to the margarine produced in Example 1 (see Tables B and C).

EXAMPLE 3

An olein fraction was produced by
(1) randomly interesterifying a mixture consisting of 63% of maize oil and 37% of maize oil hydrogenated to a melting point of 69° C., under the conditions described in Example 1 and
(2) dry-fractionating the interesterified mixture at 35° C. in a pelletizer.

A margarine fat blend was produced by mixing 30% of maize oil with 70% of the olein fraction. A margarine was produced by emulsifying 84 wt% of the fat blend and 16 wt% of an aqueous phase and processing through a Votator apparatus.

The solid fat contents of the olein fraction and of the margarine fat blend are summarized in Table E.

EXAMPLE 4

An olein fraction was produced by
(1) randomly interestifying a mixture consisting of 63% of soybean oil and 37% of soybean oil hydrogenated to a melting point of 69° C. The hydrogenation and interesterification were conducted under the conditions described in Example 1 and
(2) dry-fractionating of the interesterified mixture at 35° C. in a pelletizer.

A margarine fat blend was produced by mixing 40 wt% of soybean oil and 60 wt% of olein. A margarine was produced by emulsifying 84 wt% of this fat blend with 16 wt% of an aqueous phase and processing through a Votator apparatus.

The solid fat contents of the olein and of the margarine fat blend and its level of trans fatty acids are summarized in Table E.

TABLE A

| | % Solids | | | | | | Fatty Acid Composition | | | | | | Trans % |
|---|---|---|---|---|---|---|---|---|---|---|---|---|---|
| | $N_{10}$ | $N_{15}$ | $N_{20}$ | $N_{25}$ | $N_{30}$ | $N_{35}$ | $C_{16}$ | $C_{28}$ | $C_{18:1}$ | $C_{18:2}$ | $C_{20}$ | $C_{22}$ | |
| Interesterified blend | 46.9 | 39.2 | 27.7 | 19.3 | 14.4 | 11.1 | 8.4 | 38.6 | 14.2 | 35.1 | 0.8 | 0.9 | — |
| Olein fraction | 37.4 | 27.3 | 11.5 | 0.8 | 3.5 | 0.8 | 7.7 | 23.6 | 15.5 | 42.7 | 0.6 | 0.2 | 3 |
| Stearin | 57.9 | 52.9 | 46.6 | 38.7 | 32.4 | 26.8 | 7.9 | 42.8 | 12.4 | 33.6 | 0.7 | 1.0 | — |

TABLE A-continued

| | % Solids | | | | | | Fatty Acid Composition | | | | | | Trans % |
|---|---|---|---|---|---|---|---|---|---|---|---|---|---|
| | $N_{10}$ | $N_{15}$ | $N_{20}$ | $N_{25}$ | $N_{30}$ | $N_{35}$ | $C_{16}$ | $C_{28}$ | $C_{18:1}$ | $C_{18:2}$ | $C_{20}$ | $C_{22}$ | |
| fraction | | | | | | | | | | | | | |

TABLE B

| | % Solids | | | | | GLC-Data | | | | | | Trans % |
|---|---|---|---|---|---|---|---|---|---|---|---|---|
| | $N_{10}$ | $N_{15}$ | $N_{20}$ | $N_{25}$ | $N_{30}$ | $C_{16}$ | $C_{18}$ | $C_{18:1}$ | $C_{18:2}$ | $C_{20}$ | $C_{22}$ | |
| Sunflower oil | | | | | | 6.8 | 4.5 | 23.3 | 62.9 | 0.3 | 1.3 | 0 |
| Margarine fat blend | 27.9 | 19.4 | 8.2 | 2.7 | 0.2 | 7.7 | 26.3 | 17.3 | 46.7 | 0.5 | 0.5 | 3 |

Analytical data of the margarine sample:

TABLE C

| | | Assessment after | | |
|---|---|---|---|---|
| | | 1 week | 4 weeks | 10 weeks |
| C-values (hardness*) [g/cm$^2$] | 5° C. | 1800 | 1500 | 1800 |
| | 10° C. | 1500 | 1500 | 1200 |
| | 15° C. | 750 | 660 | 600 |
| | 20° C. | 140 | 90 | 60 |
| | 23° C. | 50 | 40 | 40 |
| Sandiness at T | ≦23° C. | none | none | none |
| Oily exudation [mg/cm$^2$] | 20° C. | 100 | | |
| Panel assessment of the melting behaviour in the mouth | 5° C. | good | good | good |
| | 15° C. | good | good | good |

*Method described in J.A.C.S., 36 (1959), pp. 345-348, Haighton et al

TABLE D

Re-use of the stearin by dry fractionation

| No | % Solids | | | | | | Fatty Acid Composition | | | | | |
|---|---|---|---|---|---|---|---|---|---|---|---|---|
| | $N_{10}$ | $N_{15}$ | $N_{20}$ | $N_{25}$ | $N_{30}$ | $N_{35}$ | $C_{16}$ | $C_{18}$ | $C_{18:1}$ | $C_{18:2}$ | $C_{20}$ | $C_{22}$ |
| (1) Hydrogenated stearin | 97.1 | 96.8 | 96.3 | 95.0 | 92.6 | 91.0 | 10.3 | 85.9 | — | 0.3 | 0.8 | 1.0 |
| (2) Interesterified blend I | 42.9 | 35.1 | 23.9 | 15.2 | 11.2 | 9.2 | 7.7 | 35.9 | 13.6 | 40.3 | 0.5 | 0.9 |
| (3) Interesterified blend II | 48.7 | 41.4 | 30.1 | 19.7 | 18.5 | 12.1 | 8.6 | 37.0 | 14.0 | 38.3 | 0.8 | 1.0 |
| (4) Olein fraction from interesterified blend I | 35.3 | 25.6 | 10.9 | 3.0 | 2.1 | 0.6 | 7.0 | 32.0 | 14.4 | 44.0 | 0.7 | 0.8 |
| (5) Stearin fraction from interesterified blend I | 52.9 | 47.8 | 41.0 | 32.9 | 27.5 | 23.1 | 8.2 | 42.0 | 11.8 | 35.0 | 0.8 | 1.1 |
| (6) Olein fraction from interesterified blend II | 39.2 | 29.4 | 12.7 | 3.5 | 1.8 | 0.6 | 7.9 | 33.8 | 14.5 | 40.9 | 0.7 | 0.9 |
| (7) Stearin fraction from interesterified blend II | 51.4 | 44.6 | 38.9 | 33.8 | 29.0 | 24.2 | 9.2 | 44.0 | 11.9 | 31.9 | 0.7 | 1.2 |

TABLE E

| | % Solids | | | | Trans level % |
|---|---|---|---|---|---|
| | $N_{10}$ | $N_{20}$ | $N_{30}$ | $N_{35}$ | |
| Olein from maize oil | 43.4 | 13.5 | 2.7 | 0.8 | |
| Olein from soybean oil | 41.0 | 15.5 | 4.7 | 3.1 | |
| Fat blend based on maize oil | 19.6 | 26.2 | 6.6 | 0 | <3 |
| Fat blend based on soybean oil | 16.0 | 22.5 | 6.0 | 1.5 | <3 |

We claim:

1. A process for producing a margarine fat, comprising:
   (1) randomly interesterifying a mixture containing 45-75 wt% of an oil (i) in which at least 20% of the fatty acid residues consist of linoleic acid and 25-55 wt% of an oil or fat (ii) in which at least 80% of the fatty acid residues in saturated and has a chain length of at least 16 carbon atoms;
   (2) fractionating the resulting interesterified mixture to separate an olein having the following solid fat content:
   $N_{10}=25-53$
   $N_{20}=8-28$
   $N_{30}=1-6$
   $N_{35}=0-4$,
   from a higher melting stearin;
   (3) separating the higher melting stearin to obtain said olein; and
   (4) mixing 50-90% of the olein with 10-50 wt% of an oil (iii) in which at least 40% of the fatty acid residues consist of linoleic acid.

2. A process according to claim 1, in which oil (i) is a vegetable oil selected from the group consisting of soybean oil, sunflower oil, safflower oil, rapeseed oil, cottonseed oil, maize oil, olive oil and mixtures thereof.

3. A process according to claim 1, in which the oil or fat (ii) is a hydrogenated oil having a melting point ranging from 50° to 70° C. and an iodine value of less than 10.

4. A process according to claim 3, in which the oil or fat (ii) is a hydrogenated oil selected from the group consisting of hydrogenated soybean oil, sunflower oil, safflower oil, rapeseed oil, cottonseed oil, maize oil, olive oil and mixtures of said hydrogenated oils.

5. A process according to claim 1, in which oil (iii) is selected from the group consisting of sunflower oil, safflower oil, rapeseed oil, grapeseed oil, soybean oil, cottonseed oil, maize oil and mixtures thereof.

6. A process according to claim 1, in which oil (i), oil (ii) and oil (iii) are of the same source.

7. A process according to claim 6, in which oil (i), oil (ii) and oil (iii) consist of sunflower oil.

8. A process according to claim 1, in which the random interesterification is carried out at 25°-175° C. under substantially moisture-free conditions using an alkali metal, an alkali metal hydroxide or alkoxide.

9. A process according to claim 1, in which step (2) consists of a dry-fractionation at a temperature ranging from 30° to 40° C.

10. A process according to claim 1, in which the stearin obtained in step (2) has the following solid fat contents: $N_{10}=45-70$; $N_{15}=44-65$; $N_{20}=42-52$; $N_{25}=30-40$; $N_{30}=27-37$; $N_{35}=20-30$.

11. A process according to claim 1, further comprising recirculating the stearin obtained in step (2) by substituting in step (1) the stearin for at least part of the oil or fat (ii).

12. A process according to claim 11, comprising recirculating the stearin obtained in step (2) after hydrogenation thereof to a melting point and degree of saturation which are substantially equal to those of oil or fat (ii).

13. A process according to claim 1, in which the triglycerides of the interesterified mixture comprise:

(i) 30–60% of saturated $C_{16}$ or $C_{18}$ fatty acid residues, the remainder being unsaturated fatty acid residues;

(ii) 3 to 20% of triglycerides derived from tri-saturated fatty acid residues.

14. A process according to claim 1, in which fractionation is carried out under conditions such that the level of triglycerides derived from tri-saturated fatty acids is less than 6%.

15. A margarine fat made according to the process of claim 1 comprising:

(1) 10–50 wt% of said oil (iii); and
(2) 90–50 wt% of said olein;

said margarine fat having the following characteristics:
$N_{10}=20-35$
$N_{20}=5-15$
$N_{30}=0-2$
$N_{10}-N_{30}=\geq 10$, and a level of trans fatty acids not exceeding 15%.

16. A margarine comprising a fat blend essentially consisting of the margarine fat of claim 15 with an aqueous phase.

* * * * *

UNITED STATES PATENT AND TRADEMARK OFFICE
CERTIFICATE OF CORRECTION

PATENT NO. : 4,425,371
DATED : Jan. 10, 1984
INVENTOR(S) : Stratmann, et al.

It is certified that error appears in the above—identified patent and that said Letters Patent is hereby corrected as shown below:

Column 5, line 67, "residues in saturated" should read --residues is saturated--.

Signed and Sealed this

Second Day of April 1985

[SEAL]

Attest:

DONALD J. QUIGG

Attesting Officer

Acting Commissioner of Patents and Trademarks